(12) United States Patent
Berndl

(10) Patent No.: US 6,241,458 B1
(45) Date of Patent: Jun. 5, 2001

(54) STACKER FOR GROUPING AND STACKING SUBSTANTIALLY FLAT ARTICLES

(75) Inventor: Ernst H. Berndl, Memmingen (DE)

(73) Assignee: Skinetta Pac-Systeme Kiener GmbH & Co., Ottobeuren (DE)

( * ) Notice: Subject to any disclaimer, the term of this patent is extended or adjusted under 35 U.S.C. 154(b) by 0 days.

(21) Appl. No.: 09/301,560

(22) Filed: Apr. 29, 1999

(30) Foreign Application Priority Data

May 9, 1998 (DE) ................................. 198 20 805

(51) Int. Cl.[7] .................................................. B65G 57/03
(52) U.S. Cl. ........................... 414/790.3; 414/790.4; 414/790.9; 414/794.1; 414/795
(58) Field of Search ........................ 414/790.3, 790.4, 414/790.8, 790.9, 794.4, 794.1, 795, 788.2

(56) References Cited

U.S. PATENT DOCUMENTS

| | | | |
|---|---|---|---|
| 2,947,125 | * | 8/1960 | Wilson et al. ................... 414/790.3 |
| 2,981,420 | * | 4/1961 | Johanson ......................... 414/790.3 |
| 3,532,230 | * | 10/1970 | Gutberlet et al. .............. 414/790.3 |
| 3,718,267 | * | 2/1973 | Hiebert et al. .................. 414/790.3 |
| 3,745,740 | * | 7/1973 | Williams ......................... 414/790.3 |
| 4,865,515 | * | 9/1989 | Dorner et al. .................. 414/788.2 |
| 5,069,598 | * | 12/1991 | Kleinhen et al. .............. 414/790 |
| 5,116,195 | * | 5/1992 | Pattarozzi ....................... 414/790.3 |
| 5,186,600 | * | 2/1993 | Wokeck et al. ................ 414/793.4 |

* cited by examiner

Primary Examiner—Joseph A. Fischetti
(74) Attorney, Agent, or Firm—Jacobson, Price, Holman & Stern, PLLC

(57) ABSTRACT

A stacker for stacking articles, particularly blister packs, into stacks of goods, including a goods feeder, a primary packing unit and a unit for supplying the stacks for secondary packing or processing. The packing unit has a goods magazine with a goods support, on which the articles inserted in the magazine may be deposited to form stacks of goods. The goods magazine has a first goods support and a second goods support, the first support being arranged above the stack of goods until the stack resting on the second support is removed. A further stack may be piled up on the first support and lowered into the removal position following the removal of the stack located below it.

9 Claims, 3 Drawing Sheets

STACKER FOR GROUPING AND STACKING SUBSTANTIALLY FLAT ARTICLES

BACKGROUND OF THE INVENTION

The present invention relates to a stacker for grouping and stacking substantially flat articles, particularly goods or packages of goods in the form of blister packs, into stacks of goods, comprising a goods feeder, a primary packing unit and a unit for supplying or passing on the stacks of articles piled up in multiple layers by the primary packing unit for subsequent secondary packaging or processing, wherein the goods feeder can separate the articles supplied to it and feed them to the primary packing unit in generally controlled manner, one after another and the packing unit has a goods magazine with a goods support, on which the articles, which are inserted in the magazine from above by the feeder, may be superimposed in multiple layers to form stacks of goods, and wherein the completed stacks may be removed from the magazine by means of an ejection unit and fed to the supply unit.

Stackers of this type are known in a general way from packaging technology. In these stackers flat articles—e.g. where medicaments have to be packed, the so-called blister packs, in which individual tablets are welded in between a plastic film and an aluminium sheet—are supplied to a goods magazine by a goods feeder. Packaging lines of this type are usually arranged directly after the production line and immediately apply the primary and secondary packing to the goods just produced. In these lines the individual goods are first aligned one behind the other by suitable separating means, then grouped ready for packing before being passed on to the actual packaging machine.

In the case of flat articles being packed one above the other in cartons or similar packs, the goods are either grouped directly or first put together in a pre-pack, such as the card-like blister packs for tablets, then finally packed in a re-packing device in the form in which they will be put on the market. For this purpose the stack of goods formed by the stacker is held by a cassette, then the carton of the re-packing device is folded around the stack. The individual articles are supplied to the goods feeder, for example via a hopper or a moving belt of the production line. The parts are then first separated and aligned one behind the other by wipers, reverse motion belts or similar means.

The goods feeder is generally provided with identification means allowing the exact quantities of goods brought into the magazine to be counted or weighed. The desired number of parts to be stacked up is in turn superimposed and aligned in the magazine. When such a stack has been formed for packing or further processing, it is passed to the supply unit by the ejection unit. The ejection unit may for example be in the form of a pressure member by which the completed stack may be slid laterally out of the magazine.

Known stackers however have the disadvantage that the flow of goods camuot be continuous. While the ejection unit is in action the stacking process in the magazine has to stop in order not to interrupt the hand-over of the finished stack. There are thus idle times both at the feeder and in part of the magazine during ejection. This lengthens the processing time and thereby increases operating costs and the capital costs of the stacker.

Another disadvantage is that production lines usually operate continuously, so the material flow to the feed of the stacker is also continuous. Discontinuous operation of the stacker thus requires a material buffer in the region of the feeder, which again necessitates extra expenditure and may be a further source of interference with the flow of material in the packaging line. This drawback has been eliminated in a known further development of the stacker, by the provision of a second primary packing unit, with the two units being charged alternately.

Although continuous operation is possible with this construction, as the stacking process can take place in one packing unit while the ejection unit in the other is passing on the finished stack to the supply unit, it is at the cost of considerable capital expenditure on the extended logistics of the material flow. Thus suitable diversion and re-combining points must be provided, first to divide the stream of goods between the two packing units then to bring them together again after the stacking process. There is thus an increase in expenditure both on the stacker and on the necessary space requirement.

An object of the invention is to provide a stacker where the processing speed is increased at the lowest possible additional cost.

BRIEF SUMMARY OF THE INVENTION

The invention provides a stacker for grouping and stacking substantially flat articles in which the goods magazine has a first goods support and at least a second goods support, and the first support is arranged above the stack of goods resting on the second support until the completed stack resting on the second support is removed from the magazine, a further stack being stackable on the first support, this upper stack being lowerable into the removal position following the removal of the stack below it.

With the stacker construction according to the invention it is now possible to start grouping the next stack even while the ejection unit is passing on a completed stack to the supply unit. When the lower stack has been passed on to the supply unit, the ejection unit returns to its starting position and the upper stack can then be lowered, so that when it is fully assembled it can in turn be passed by the ejection unit to the supply unit. The feed can operate continuously, and there is a significant increase in the quantity of completed stacks ejected, without any costly redundancy of the packing unit.

The stack-lowering effect may be produced either by making the first and second goods supports movable and drivable, or by constructing the upper support so that its carrying action can be cancelled to drop the (part-)stack piled up on it.

In a preferred embodiment of the stacker the magazine, in which the stack of articles to be packed is formed, is bounded by a wall which guides the articles while they are being inserted in the magazine from above. This wall has the first and second goods supports, which are formed by carriers. The carriers in turn extend far enough into the stacking region, formed by the interior of the magazine, to ensure that the lowermost article is securely held and supported.

The distance between the first and second supports may be fixed but is preferably variable so that allowance can be made for different stack heights. For this purpose at least part of the wall of the magazine is formed by a belt surface of conveyor belts arranged to revolve vertically. The carriers are arranged on the conveyor belts so that movement of the belt adjusts the height of the carriers. In this embodiment the conveyor belts are moved in one direction only, so that the interior—facing towards the stacking region—moves downwardly. The carriers thus move from the position of the first support in the magazine, with goods placed on it, down to the position of the second support. Then when the ejection unit has completed its action and returned to its starting position, the carriers first move outwardly and, after another change of direction, pass into the stacking region again from above with the conveyor belt. In this way the carriers of the first support first become the carriers of the second support by moving down, and then become those of the first support again.

The individual carriers of the first and second supports may be arranged on a common conveyor belt, in which case the distance between the first and second supports is fixed. For general applications this distance should be of an adequate size in order to give the stacker sufficient flexibility.

The wall of the magazine may have one, two or more conveyor belts. With light articles in a small plant the size of the carriers may be such that even a single carrier can support the whole article. In that case one conveyor belt is sufficient. With larger plant and larger articles a three or four-point bearing for the article may be resorted to, in which case at least a second conveyor belt is used and the carriers are arranged on the belts so that those associated with the first and second supports are substantially in one plane and the speed of the individual belts is synchronised. This last effect can be reliably obtained for example by having a common drive, for example with a belt or chain drive with appropriate drive gears or pinions.

In a further embodiment of the invention two or more different types of support may be provided, formed for example by an appropriate number of conveyor belts. The magazine is then long enough to provide an intermediate buffer for quite a large number of formed stacks, so that new stacks can be received above and the ready-packed stacks transferred below.

In a preferred embodiment the carriers of the first support and those of the second support are, however, arranged separately on first and second conveyor belts which can be driven independently. In this construction the wall of the magazine may be formed by four opposing pairs of conveyor belts, each pair comprising a first and a second belt. The magazine may for example be open at the sides or covered by strips or guides for guiding the articles.

In this embodiment the first support can be adjusted in height independently of the second, and the distance between the two supports can thus be adapted individually to the height of the particular stack to be assembled. The distance between the first and second supports may be adapted by means of two drives, whereby the first and second conveyor belts can be moved into appropriate relative positions. Alternatively the two belts may be driven synchronously by a common drive and the distance may be adjusted by a means for releasing or otherwise adjusting one or both conveyor belts; the distance is only adjusted when the stacker is set up for a new batch or pack size. The first and second conveyor belts, or the conveyor belt if only one is used, may be driven by stepping or servo motors.

In order to increase output the stacker according to the invention may be made as a so-called tandem construction, provided with two primary packing units. The advantage is then that the second packing unit is no longer required to compensate for a stoppage time of the first unit, and instead operates simultaneously with the first. Output from the tandem construction is doubled by this development, as compared with the previously employed construction with alternate use of the packing unit. The tandem construction may have a common feed or may be supplied by two alternating feeders.

The supply unit grips the stack, which is slid out of the primary packing unit by the ejection unit, in the case of a packaging line preferably by means of a transfer cassette which can engage round the stack in a dimensionally stable manner and pass it on to another machine for final secondary packing. The ejection unit may be formed by a slide which may be inserted laterally in the stacking region and which slides the stack through an opposing aperture in the wall of the magazine into the transfer cassette of the making-ready unit.

In a preferred embodiment of the invention, the magazine has a wall along which the articles inserted from above are guided during stacking, and the first goods support is formed by carriers which are arranged projecting at right angles to the wall and which can be retracted into the wall by the force of a drive for lowering the stack; the holding function of the first support may be cancelled by retraction of the carriers, and the upper stack may drop onto the lower, second support following the removal of the lower stack. Instead of a separate drive being provided to transport the stack into the magazine this may be done e.g. by gravity. Carriers which are provided at a first support and may for example be fixed, release a stack simply by being retracted. The wall is substantially adapted to the size of the article to be packed or grouped.

Such a construction improves efficiency and provides a cost-effective embodiment of the invention, since the additional drives can be dispensed with.

Other features and advantages of the invention will emerge from the sub-claims and the following description of preferred embodiments.

DETAILED DESCRIPTION

Figure 1:
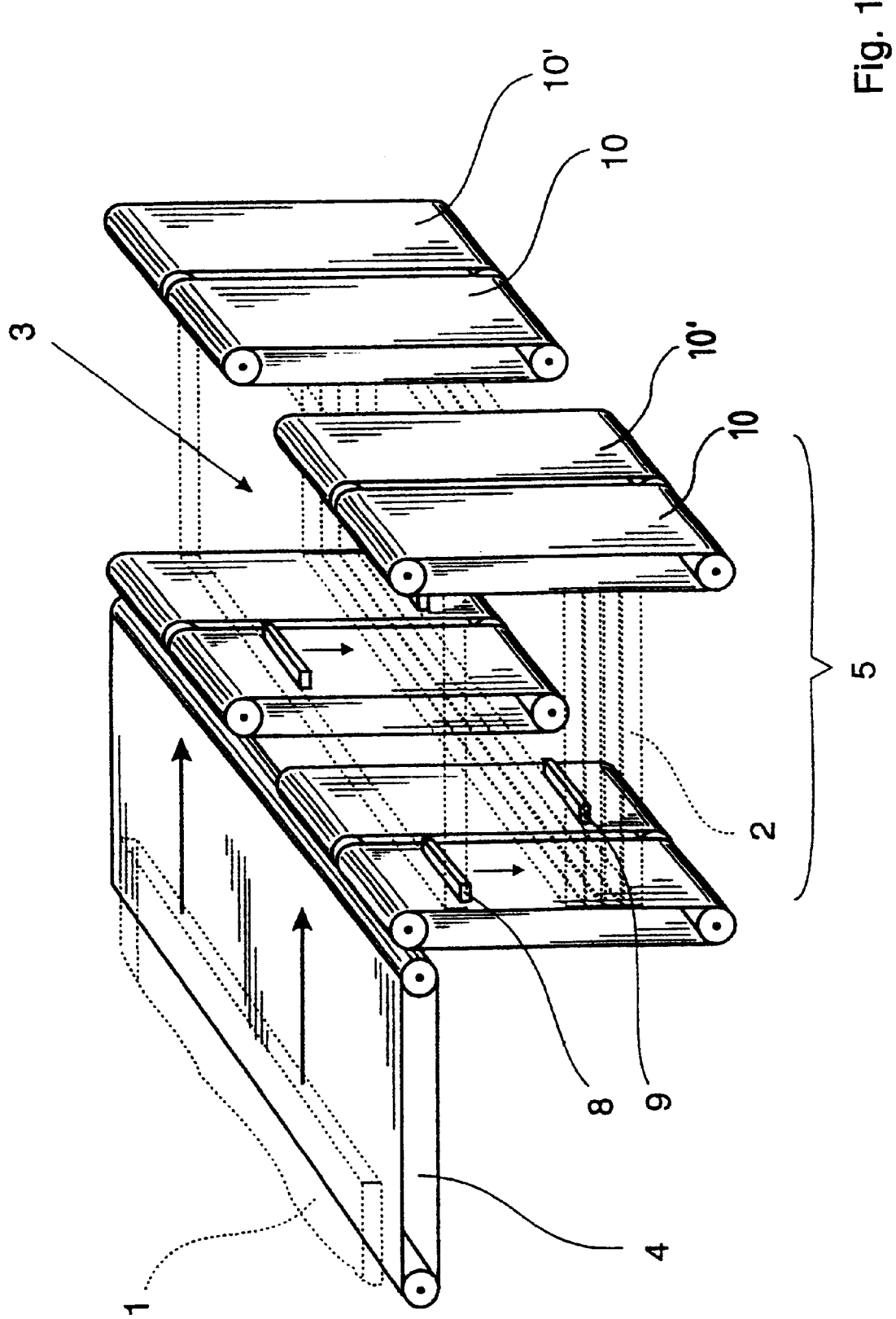
FIG. 1 is a diagrammatic view of the primary packing unit and goods feeder of a stacker according to the invention.

Referring now to FIG. 1, this shows the primary packing unit 5 and part of the goods feeder 4 of a stacker according to the invention. In this construction the wall of the goods magazine 3 is formed substantially by four pairs of conveyor belts, each made up of a first belt 10 and a second belt 10'. Said wall may naturally include other parts in addition to said conveyor belts 10, 10', stroll as one or more smooth-surfaced, stationaly guiding or sliding surfaces or other guiding elements, e.g. to prevent the articles 1 inserted from above from standing upright or tilting.

The conveyor belts 10, 10' are each provided with carriers, said carriers on the first belts 10 forming said first goods support 8 and those on the second belts 10' forming said second goods support 9. For this purpose said carriers 8, 9 belonging to each of said supports are arranged at the same level. The two conveyor belts may be driven by stepping or servo motors 11.

The flat articles 1 to be combined into a stack of goods 2 are supplied to said primary packing unit 5 by said goods feeder 4, which is represented diagrammatically here as a simple moving belt. They are inserted in the stacking region of said goods magazine 3 by gravity, with the growing stack initially resting on said upper goods support 8 while a ready-grouped stack 2 is arranged below it and will shortly be passed on to said supply unit by the ejection unit (not shown here). Identical dropping conditions may always be provided for the conveyor-fed articles 1, by arranging for example said first goods support 8, shown at the top in FIG. 2, to be lowered step by step after each article 1 according to the thickness of the article deposited as determined by a quantity control means 14, which can determine the quantity of articles passed to the primary packing unit.

When said ejection unit has slid said lower stack 2 out of said magazine and returned to its starting position said upper stack may be lowered into said ejection position. Said lowering process may be continuous if there is sufficient space between said first support 8 and said second support 9, or there may alternatively be a brief lowering operation when the sliding-out process is complete. Simultaneously with the lowering of said upper support 8, said second conveyor belts 10' are moved in the same direction as said first belts 10, whereby said carriers arranged on their belt surface first move downwardly out of the interior of said magazine 3, then re-enter the stacking region from above with said revolving conveyor belt 10, to form said upper support. In this way said respective carriers form a kind of conveyor belt successively from said upper and lower supports during the operation of said stacker. Given a magazine of suitable length, a first conveyor belt 10 may receive not just one stack but a plurality of stacks for readystacked goods. Buffering of the goods thus becomes possible.

The stacker may of course alternatively be constructed so that the stacking direction is horizontal. In that case the flat articles 1 would have to be inserted actively in said magazine 3 until they touch said carriers limiting the horizontal displacement path. This limit may then also be displaced in the manner of the invention.

Figure 3:
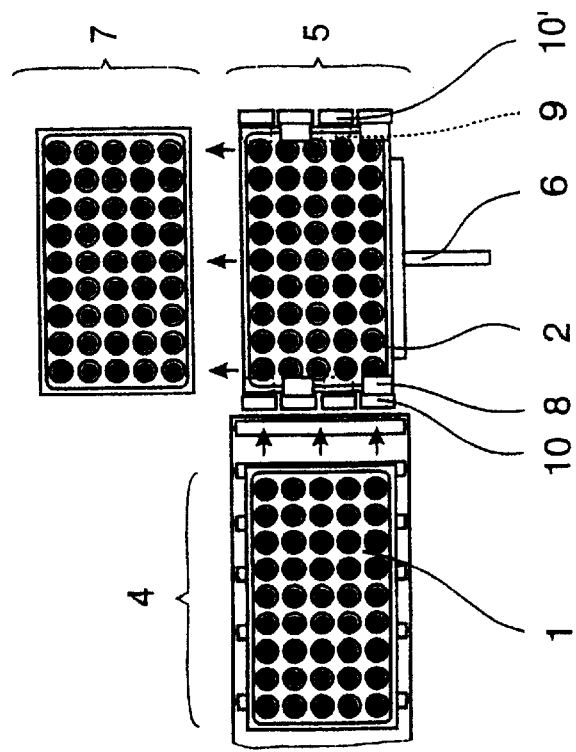
FIG. 3 is a plan view of the part of the stacker shown in FIGS. 1 and 2.
Figure 2:
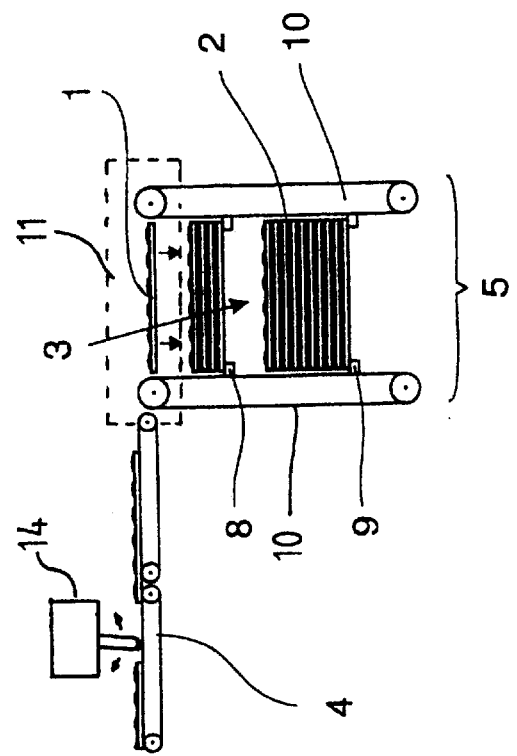
FIG. 2 is a side view of the part of the stacker shown in FIG. 1.

The part of said stacker shown in FIG. 1 is represented diagrammatically in a side elevation in FIG. 2 and in plan in FIG. 3. In this embodiment the removal direction, i.e. the direction in which said ejection unit 6 slides the finished stack of goods 2 to said supply unit 7, is at right angles to the direction of flow of the individual articles 1 inserted by the goods feeder 4, and this material flow direction is not changed in the FIG. 4 embodiment.

Here said ejection unit 6 is shown diagrammatically as a pressure member which slides said stack 2 into a goods cassette 13 of said supply unit 7, which maintains the shape and stacking density of the stack. Said cassette 13 enables said stack 2 then to be fed, securely gripped, to the further packing stage.

Figure 4:
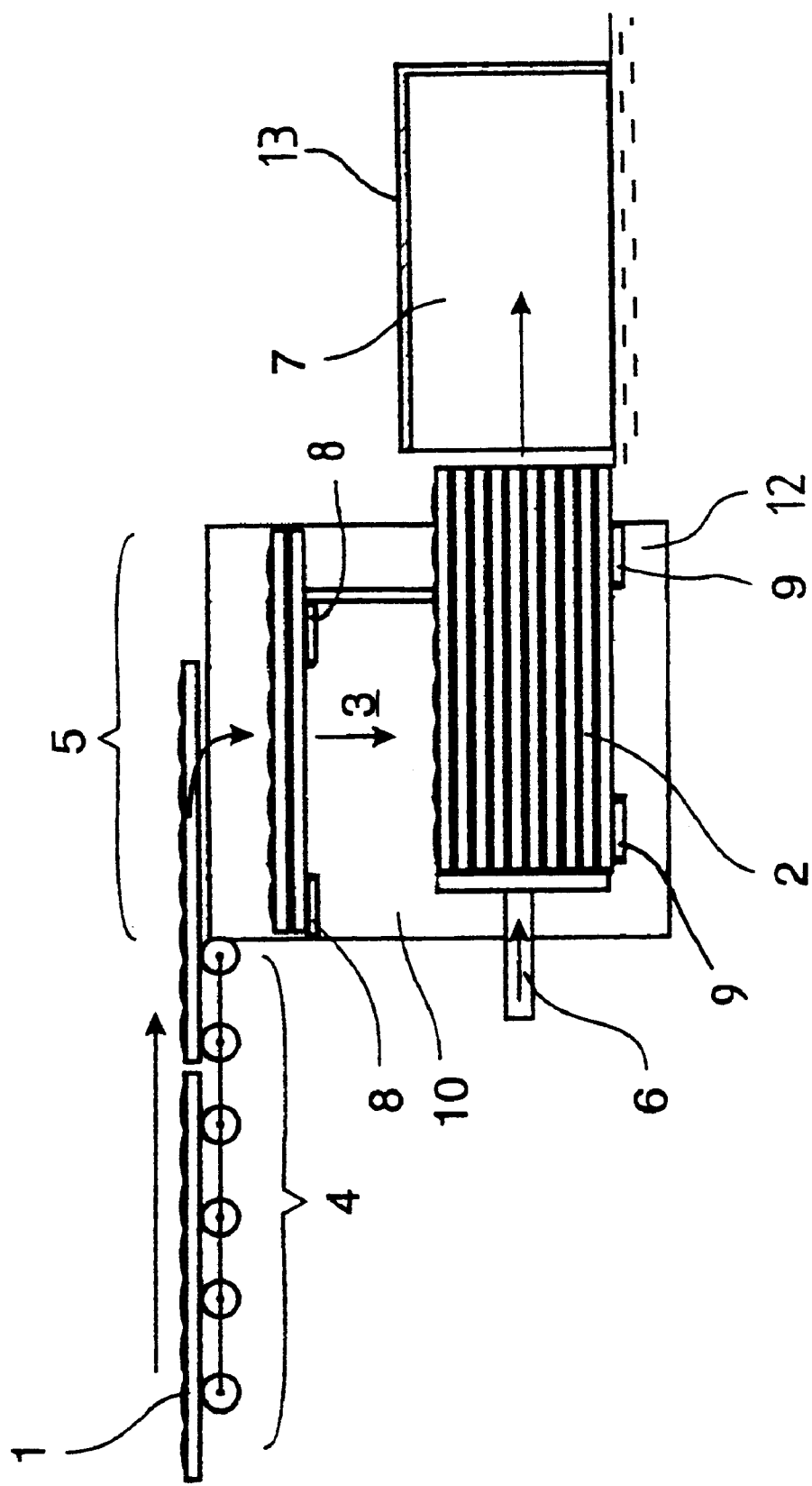
FIG. 4 is a side view of an alternative embodiment of a stacker according to the invention.

In the FIG. 4 embodiment said first, upper goods support 8 is already moving slowly downwards while said ejection unit 6 passes on said lower stack 2 to said supply unit 7. This pre-supposes that the two conveyor belts 10, 10' are not moved synchronously, as said lower support 9 has to stand still during the sliding-out process.

In an advantageous development of the primary packing unit 5 said conveyor belts 10, 10' may be moved synchronously, so that a common drive may easily be used without a large mechanical outlay. For this purpose said magazine 3 may have a lower base 12, which takes over the function of said lower goods support when said continuously moving carriers of the first support 8 or second support 9 have passed through.

Although the invention has been described above substantially in connection with a machine preparing the stack of goods 2 for subsequent packing, it may naturally also be used in other applications where flat articles or attached goods have to be grouped.

What is claimed is:

1. A stacker for grouping and stacking substantially flat articles into stacks of goods, said stacker comprising:

a goods feeder, a primary packing unit and a supply unit for supplying said stacks of goods piled up in multiple layers by said primary packing unit for subsequent secondary packing, said goods feeder separating the goods supplied to said goods feeder and feeding the goods to said primary packing unit in a generally controlled manner one after another, said packing unit having a goods magazine with a goods support, the articles inserted in said magazine from above by said goods feeder being supported by said goods support and being superimposed in multiple layers to form said stacks of goods, and said stacks of goods being removed from said magazine by an ejection unit and fed to said supply unit, said goods magazine having a first goods support and at least one second goods support, and said first goods support being arranged above said stack of goods resting on said second goods support until said stack of goods resting on said at least one second goods support is removed from said magazine, a further stack of goods being stackable on said first support, said further stack being lowerable into a removal position following removal of said stack of goods located below said further stack, said magazine having a wall bounding a stacking region and said goods inserted from above are guided by said wall during stacking, and said first goods support and said at least one second goods support are formed by carriers mounted vertically displaceably on said wall, said wall of said magazine having at least one pair of opposing first conveyor belts, and at least one pair of opposing second conveyor belts each said second conveyor belt being arranged respectively adjacent one of said first conveyor belts and said carriers of said first pairs of belts and said second pairs of belts engage under a lowermost of said stack of goods at two opposing sides.

2. A stacker according to claim 1, wherein said first pair of conveyor belts and second pair of conveyor belts are driven independently of each other.

3. A stacker according to claim 1, wherein said carriers are arranged projecting at right angles to said wall and are retracted into said wall by a force of a drive for lowering said stack of goods, and said further stack may drop onto said carriers following removal of said lower stack.

4. A stacker according to claim 3, wherein said carriers of said first support are vertically displaceable for adaptation to stacks of different heights.

5. A stacker according to claim 1, further comprising at least two primary packing units, and said goods feeder can feed the goods to be grouped substantially alternately to the primary packing units.

6. A stacker according to claim 1, wherein said supply unit has at least one transfer cassette, said stack of goods can be passed by said ejection unit to said at least one transfer cassette and said at least one transfer cassette can engage around said stack pending further processing.

7. A stacker according to claim 6, wherein said ejection unit is formed by a slide, said slide is guided into said stacking region and slides said stack into said transfer cassette of said supply unit.

8. A stacker according to claim 1, wherein said goods feeder has a quantity control means for determining a quantity of goods passed to said primary packing unit.

9. A stacker according to claim 1, wherein said carriers are vertically displaceable downwardly, projecting into said stacking region, and are vertically displaceable upwardly outside said stacking region, following removal of said stack of goods bearing on said carriers.

* * * * *